United States Patent
Tung

(10) Patent No.: US 10,970,804 B2
(45) Date of Patent: Apr. 6, 2021

(54) IMAGE PROCESSING DEVICE AND IMAGE PROCESSING METHOD FOR SELECTING REGIONS BASED ON GRADIATION FOR EMBEDDING A WATERMARK

(71) Applicant: Rakuten, Inc., Tokyo (JP)

(72) Inventor: Tony Tung, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 104 days.

(21) Appl. No.: 16/073,336

(22) PCT Filed: Jan. 27, 2016

(86) PCT No.: PCT/JP2016/052369
§ 371 (c)(1),
(2) Date: Jul. 26, 2018

(87) PCT Pub. No.: WO2017/130334
PCT Pub. Date: Aug. 3, 2017

(65) Prior Publication Data
US 2019/0066254 A1    Feb. 28, 2019

(51) Int. Cl.
*G06K 9/00* (2006.01)
*G06T 1/00* (2006.01)
(Continued)

(52) U.S. Cl.
CPC .............. *G06T 1/0071* (2013.01); *G06T 1/00* (2013.01); *G06T 5/40* (2013.01); *G06T 7/90* (2017.01);
(Continued)

(58) Field of Classification Search
CPC ..... G06T 2201/0051; G06T 2201/0064; G06T 2201/0065; G06T 1/0071; G06T 1/00;
(Continued)

(56) References Cited

U.S. PATENT DOCUMENTS

2005/0190948 A1*  9/2005  Isogai ............... H04N 1/32144
                                                      382/100
2006/0008112 A1*  1/2006  Reed ..................... G06T 1/0085
                                                      382/100
(Continued)

FOREIGN PATENT DOCUMENTS

JP    H10-051639 A    2/1998
JP    2001-285621 A    10/2001
(Continued)

OTHER PUBLICATIONS

Shin et al (a new watermarking method using entropy-based region segmentation, SPIE conference on multimedia systems applications, vol. 3528, pp. 531-538, Jan. 1, 1999) (Year: 1999).*

(Continued)

*Primary Examiner* — Amara Abdi
(74) *Attorney, Agent, or Firm* — HEA Law PLLC

(57) ABSTRACT

Certainty of detecting a watermark embedded in a color image is increased. Image data acquisition means of an image processing device acquires image data. Histogram generation means generates, based on pixel values of an image indicated by the image data acquired by the image data acquisition means, a histogram for each region in the image. Region selection means selects tom the image a region having a sparse color distribution in the histogram generated by the histogram generation means. Image processing means embeds a watermark in the region selected by the region selection means.

6 Claims, 9 Drawing Sheets

(51) Int. Cl.
- *H04N 1/387* (2006.01)
- *G06T 7/90* (2017.01)
- *G06T 5/40* (2006.01)

(52) U.S. Cl.
CPC ..... *H04N 1/387* (2013.01); *G06T 2201/0051* (2013.01); *G06T 2201/0064* (2013.01); *G06T 2201/0065* (2013.01); *G06T 2207/20072* (2013.01)

(58) Field of Classification Search
CPC ... G06T 7/90; G06T 5/40; G06T 2207/20072; H04N 1/387
See application file for complete search history.

(56) References Cited

U.S. PATENT DOCUMENTS

| | | | | |
|---|---|---|---|---|
| 2010/0329559 | A1* | 12/2010 | Shindo | G06T 5/40 382/172 |
| 2012/0086954 | A1* | 4/2012 | Kawai | G03G 15/05 358/1.1 |
| 2013/0236046 | A1 | 9/2013 | Nallusamy et al. | |

FOREIGN PATENT DOCUMENTS

| | | | | |
|---|---|---|---|---|
| JP | 2004-104233 | * | 7/2004 | ............. H04N 5/907 |
| JP | 2004-194233 | * | 7/2004 | ............... G06T 1/00 |
| JP | 2004-194233 A | | 7/2004 | |
| JP | 2005-192001 A | | 7/2005 | |
| JP | 2009-200754 | * | 9/2009 | ............... G06T 1/00 |

OTHER PUBLICATIONS

Vikas et al ("Towards increasing the robustness of image watermarking scheme against histogram equalization attack", Jaypee Institute of Information Technology University, Noida, India, IEEE 2007, pp. 1-4) (Year: 2007).*

English translation of the International Search Report for PCT/JP2016/052369.

Jae-Wook Shin, Dong-Seok Jeong, "A New Watermarking Method Using Entropy-Based Region Segmentation", Visual Communications and Image Processing; San Jose, vol. 3528, Jan. 1, 1999, pp. 531-538.

Frederic Lusson a. Karen Bailey a, Mark Leeneya, Kevin Curran, "A novel approach to digital watermarking, exploiting colour spaces", Signal Processing., vol. 93, No. 5, May 1, 2013, pp. 1268-1294, Nov. 13, 2012.

Vikas Saxena, J.P. Gupta, "Towards Increasing the Robustness of Image Watermarking Scheme Against Histogram Equalization Attack" Signal Processing and Communications Applications, 2007. SIU 2007. IEEE 15th, IEEE, Piscataway, NJ, USA, Jun. 1, 2007, pp. 1-4.

* cited by examiner

IMAGE PROCESSING DEVICE AND IMAGE PROCESSING METHOD FOR SELECTING REGIONS BASED ON GRADATION FOR EMBEDDING A WATERMARK

CROSS REFERENCE TO RELATED APPLICATIONS

This application is a National Stage of International Application No. PCT/JP2016/052369 filed on Jan. 27, 2016. The contents of the above document is incorporated herein by reference in its entirety.

TECHNICAL FIELD

The present invention relates to an image processing device, an image processing method, and a program.

BACKGROUND ART

Hitherto, there is known a technology of embedding watermarks in an image such as a still image and a moving image. For example, in Patent Literature 1, there is described a technology of embedding a watermark in an image in order to identify a source of the image posted in an unauthorized website.

CITATION LIST

Patent Literature

[PTL 1] US 2013/0236046 A1

SUMMARY OF INVENTION

Technical Problem

Pixel values change in a region of an image in which the watermark is embedded, and hence the watermark can be detected by identifying the region in which the pixel values have changed. However, it may be difficult to identify the region depending on the image. For example, when a watermark is embedded in a region in which a color presents a gradation, a pixel value of a pixel in which the watermark is embedded may change so as to be the same as adjacent pixel values. In this case, even when the pixel value in the image is referenced, the region in which the pixel values have changed may not be identified, and the watermark may not thus be detected.

The present invention has been made in view of the above-mentioned problem, and therefore has an object to increase certainty of the detection of a watermark embedded in an image.

Solution to Problem

In order to solve the above-mentioned problem, an image processing device according to one embodiment of the present invention includes: image data acquisition means for acquiring image data; histogram generation means for generating, based on pixel values of an image indicated by the image data acquired by the image data acquisition means, a histogram for each region in the image; region selection means for selecting from the image a region having a sparse color distribution in the histogram generated by the histogram generation means; and image processing means for embedding a watermark in the region selected by the region selection means.

An image processing method according to one embodiment of the present invention includes: an image data acquisition step of acquiring image data; a histogram generation step of generating, based on pixel values of an image indicated in the image data acquired by the image data acquisition step, a histogram for each region in the image; a region selection step of selecting from the image a region having a sparse color distribution in the histogram generated in the histogram generation step; and an image processing step of embedding a watermark in the region selected in the region selection step.

A program according to one embodiment of the present invention causes a computer to function as: image data acquisition means for acquiring image data; histogram generation means for generating, based on pixel values of an image indicated by the image data acquired by the image data acquisition means, a histogram for each region in the image; region selection means for selecting from the image a region having a sparse color distribution in the histogram generated by the histogram generation means; and image processing means for embedding a watermark in the region selected by the region selection means.

Further, an information storage medium according to one embodiment of the present invention is a computer-readable information storage medium having the above-mentioned program stored thereon.

Further, in one aspect of the present invention, the image is a color image having a plurality of color channels, the histogram generation means is configured to generate the histogram in each of the plurality of color channels based on the pixel values, the region selection means is configured to select, in each of the plurality of color channels, a region having a sparse color distribution in the histogram generated by the histogram generation means, and the image processing means is configured to change a numerical value in each of the plurality of the color channels in the region selected by the region selection means in the each of the plurality of the color channels, to thereby embed the watermark in the region.

Further, in one aspect of the present invention, the histogram generation means is configured to carryout histogram equalization processing in each region in the image, and then generate the histogram.

Further, in one aspect of the present invention, the image processing device further includes request reception means for receiving a request for the image data by a user, the watermark contains information for identifying the user requesting the image data, and the image processing device further includes image provision means for providing the image data in which the watermark is embedded by the image processing means to the user who has made the request that is received by the request reception means.

Further, in one aspect of the present invention, the image processing device further includes: determination means for determining whether the image data acquired by the image data acquisition means is still image data or moving image data; and random selection means for randomly selecting a region from the image, and the image processing means is configured to embed the watermark in the region selected by the region selection means when the determination means determines that the image data is still image data, and to embed the watermark in the region randomly selected by the random selection means when the determination means determines that the image data is moving image data.

Further, in one aspect of the present invention, the image processing means is configured to embed, when the region selection means selects a plurality of regions, the watermarks in all of the plurality of regions.

Further, in one aspect of the present invention, the image processing means is configured to select, when a plurality of regions are selected by the region selection means, a predetermined number of regions in an order starting from a region having the most sparse color distribution in the histogram generated by the histogram generation means out of the plurality of regions, and to embed the watermarks in the predetermined number of regions.

Advantageous Effects of Invention

According to one embodiment of the present invention, it is possible to increase certainty of the detection of a watermark embedded in an image.

DESCRIPTION OF EMBODIMENTS

1. Hardware Configuration of Image Processing System

Figure 1:
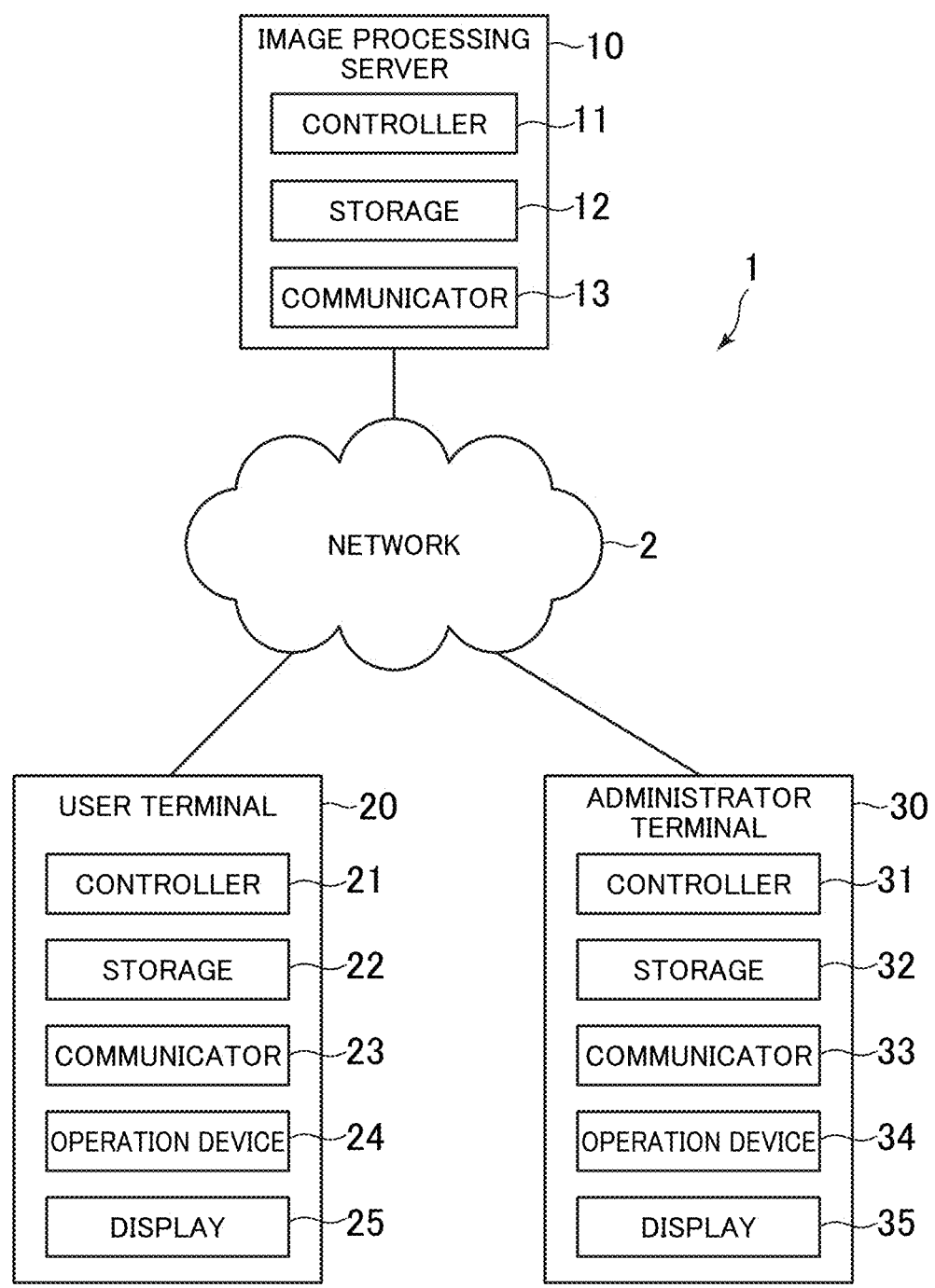
FIG. 1 is a diagram for illustrating an overall configuration of an image processing system in an embodiment of the present invention.

A description is now given of an image processing system including an image processing device according to an exemplary embodiment of the present invention. FIG. 1 is a diagram for illustrating an overall configuration of the image processing system in this embodiment. As illustrated in FIG. 1, the image processing system 1 includes an image processing server 10 (an example of the image processing device), a user terminal 20, and an administrator terminal 30. The image processing server 10, the user terminal 20, and the administrator terminal 30 are connected to one another so as to transmit/receive data to/from one another via a network 2. A description is herein given while assuming that the number of each of the image processing server 10, the user terminal 20, and the administrator terminal 30 is one, but the number of each thereof may be two or more.

The image processing server 10 is a server computer. The image processing server 10 includes a controller 11, a storage 12, and a communicator 13. The controller 11 includes, for example, one or more microprocessors. The controller 11 is configured to carry out processing in accordance with programs and data stored in the storage 12. The storage 12 includes a main storage and an auxiliary storage. For example, the main storage is a RAM, and the auxiliary storage is a hard disk drive, a solid state drive, or the like. The communicator 13 includes a network card. The communicator 13 is configured to carryout data communication via the network 2.

The user terminal 20 is a computer to be operated by a user, and is, for example, a personal computer, a cellular phone (including a smartphone), or a personal digital assistant (including a tablet computer). The user terminal 20 includes a controller 21, a storage 22, a communicator 23, an operation device 24, and a display 25. Hardware configurations of the controller 21, the storage 22, and the communicator 23 are the same as those of the controller 11, the storage 12, and the communicator 13, respectively, and a description thereof is therefore omitted.

The operation device 24 is an input device to be operated by the user, and is, for example, a mouse, a keyboard, and a touch panel. The operation device 24 is configured to transmit details of an operation by the user to the controller 21. The display 25 is, for example, a liquid crystal display or an organic EL display. The display 25 is configured to display a screen in accordance with an instruction of the controller 21.

The administrator terminal 30 is a computer to be operated by an administrator, and is, for example, a personal computer, a cellular phone (including a smartphone), or a personal digital assistant (including a tablet computer). Hardware configurations of a controller 31, a storage 32, a communicator 33, an operation device 34, and a display 35 of the administrator terminal 30 are the same as those of the controller 21, the storage 22, the communicator 23, the operation device 24, and the display 25, respectively, and a description thereof is therefore omitted.

Programs and data described as being stored in the storages 12, 22, and 32 may be supplied to the storages 12, 22, and 32 via the network 2. Moreover, the hardware configurations of the image processing server 10, the user terminal 20, and the administrator terminal 30 are not limited to the above-mentioned examples, and hardware of various computers can be applied thereto. For example, each of the image processing server 10, the user terminal 20, and the administrator terminal 30 may include a reader (for example, an optical disc drive and a memory card slot) configured to read a computer-readable information storage medium. In this case, programs and data stored in an information storage medium may be supplied to the storages 12, 22, and 32 via the reader.

In this embodiment, the image processing server 10 manages images of confidential information on a company for which the user works. For example, the image processing server 10 embeds watermarks in an image requested by a user so as to allow identification of the user when the user intentionally discloses the image to the outside of the company. On this occasion, the image processing server 10 embeds the watermark in a region having a sparse color distribution in a histogram, to thereby facilitate detection of the watermark. A detailed description is now given of this technology.

2. Functions to be Implemented in Image Processing System

Figure 2:
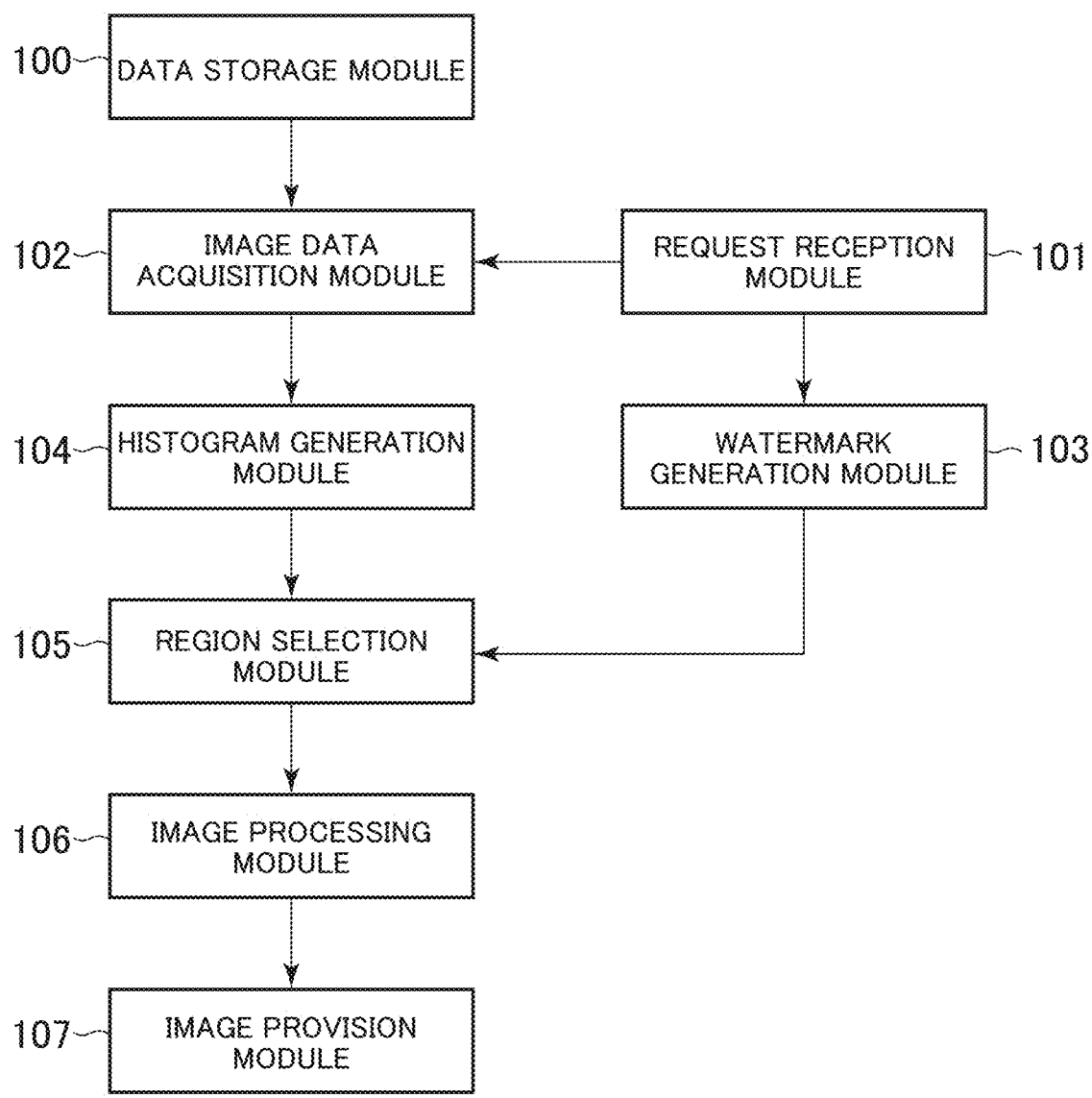
FIG. 2 is a functional block diagram for illustrating an example of functions to be implemented by the image processing system.

FIG. 2 is a functional block diagram for illustrating an example of functions to be implemented in the image processing system 1. In this embodiment, a description is mainly given of functions to be implemented in the image processing server 10. As illustrated in FIG. 2, a data storage module 100, a request reception module 101, an image data acquisition module 102, a watermark generation module 103, a histogram generation module 104, a region selection module 105, an image processing module 106, and an image provision module 107 are implemented in the image processing server 10.

[2-1. Data Storage Module]

The data storage module 100 is implemented mainly by the storage 12. The data storage module 100 is configured to store various types of data for embedding watermarks in an image. For example, the data storage module 100 stores a user database and an image database.

The user database stores information on users who use the image processing system 1. For example, the user database stores user IDs (for example, employee numbers) each for uniquely identifying a user, and private information on users. The private information includes, for example, a user name (for example, a name and a user account), an assigned section of the user (for example, a company name and a department to which the user belongs), and contact information of the user (for example, a phone number and an email address).

The image database stores information on image data managed by the image processing server 10. The image data may be still image data or moving image data. Moreover, an image indicated by the image data may be a grayscale image or a color image having a plurality of color channels. In this embodiment, a description is given of a case in which the image data indicates a color still image as an example.

The image data itself or only locations of the image data may be stored in the image database. The location of the image data is a storage location of the image data, and is, for example, link information such as a folder (directory) or a URL at which the image data is stored. The image data may be stored in the image processing server 10, or may be stored in another computer connected to the image processing server 10 so that the data can be transmitted/received to/from the image processing server 10. Moreover, a type and a data size of the image data may be stored in the image database. The type of the image data is, for example, an extension of the image data and color depth information.

The data stored in the data storage module 100 is not limited to the above-mentioned example. The data storage module 100 may store various types of data. For example, when information on a creator and administrator of the image data is contained in the watermark, the data storage module 100 may store the information on the creator and the administrator for each piece of the image data.

[2-2. Request Reception Module]

The request reception module 101 is implemented mainly by the controller 11. The request reception module 101 is configured to receive a request for image data by the user. The request for image data is an acquisition request or a display request for the image data. For example, the request reception module 101 receives information (file name, link information, and the like) for identifying image data specified by the user from the user terminal 20, to thereby receive the request for the image data.

[2-3. Image Data Acquisition Module]

The image data acquisition module 102 is implemented mainly by the controller 11. The image date acquisition module 102 is configured to acquire image data. In this embodiment, the user requests the image data stored in the image database, and the image data acquisition module 102 thus acquires the image data specified by the user out of the plurality of pieces of image data stored in the image database.

[2-4. Watermark Generation Module]

The watermark generation module 103 is implemented mainly by the controller 11. The watermark generation module 103 is configured to generate watermarks. The watermark is also referred to as digital watermark, and is generally an image embedded in order to maintain confidentiality of data and protect copyright of data. Visible and invisible watermarks exist, but, in this embodiment, a description is given of a case in which the watermark is invisible.

The watermark contains information on the image stored in the image database. In other words, the watermark contains information on the image in which the watermark itself is to be embedded. This information is information for maintaining the confidentiality of the image and protecting the copyright of the image, and is, for example, information for identifying the user who has requested the image, information for identifying the creator of the image, and information for identifying the administrator of the image. In the following, a description is given of a case in which the watermark contains information for identifying a user who has requested the image data. The information for identifying the user is the information stored in the user database, and is, for example, the user ID, the user name, the assigned section, and the contact information.

Moreover, the watermark may be indicated as an image or a text. In this embodiment, a description is given of a case in which the watermark is indicated as an image. Further, as an example of the image, a description is given of a case in which a code defined by a given standard is used. The code may be a barcode or a 2D code. In the following, a description is given of a case in which a 2D code is used as the watermark, and the description is given of a QR code (trademark) as an example of the 2D code.

[2-5. Histogram Generation Module]

The histogram generation module 104 is implemented mainly by the controller 11. The histogram generation module 104 is configured to generate, based on pixel values of the image indicated by the image data acquired by the image data acquisition module 102, a histogram for each region in the image. The histogram indicates a frequency (number of pixels) of each gradation value.

Figure 3:
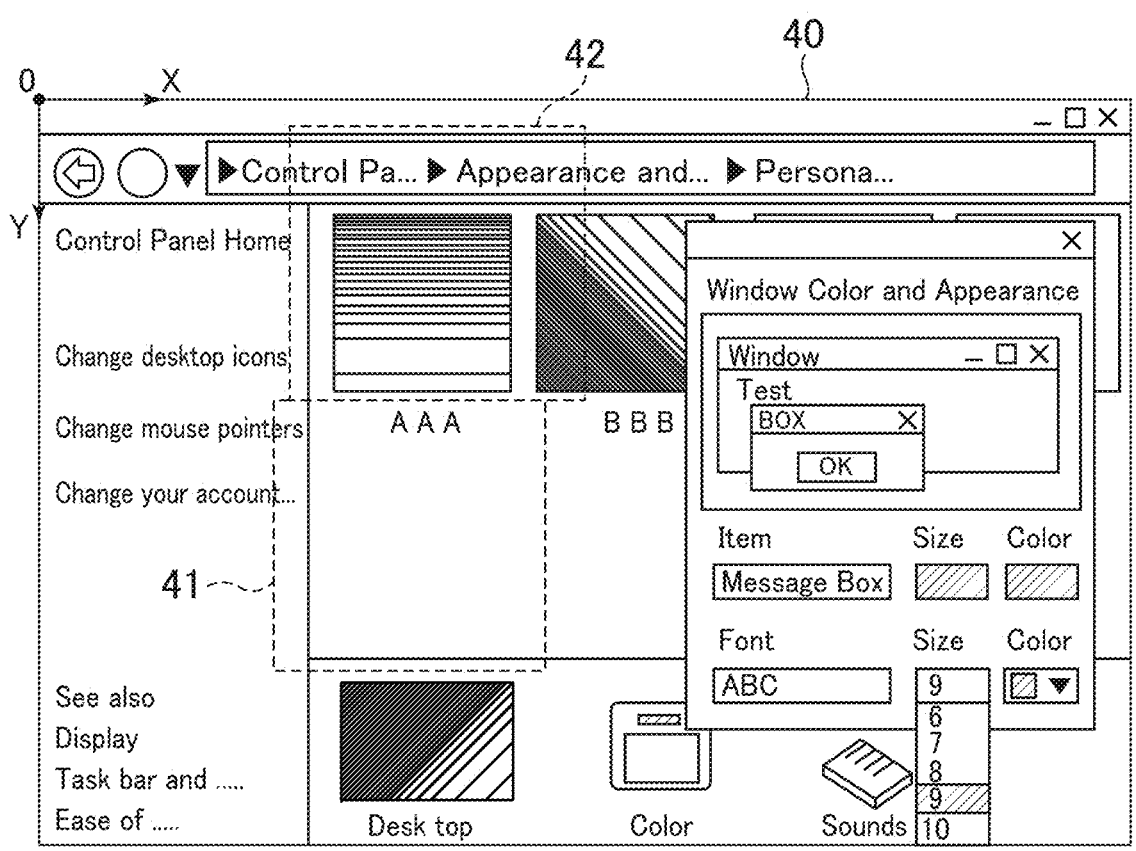
FIG. 3 is a diagram for illustrating an example of an image indicated by image data.

FIG. 3 is a diagram for illustrating an example of an image indicated by the image data. In FIG. 3, an upper left corner of an image 40 is set as an origin O of a screen coordinate system (X-Y coordinate system). In this embodiment, the image 40 is a color image, and a pixel value of each of pixels of the image 40 thus contains numerical values in respective color channels. For example, the pixel value of an RGB color image contains a numerical value $R_{xy}$ in a red channel, a numerical value $G_{xy}$ in a green channel, and a numerical value $B_{xy}$ in a blue channel. The characters x and y indicate the coordinates of the pixel. When the RGB color image is a 24-bit image, the numerical value of each of the color channels is represented in 8 bits, and thus takes any numerical value of from 0 to 255.

For example, the histogram generation module 104 generates a histogram based on the pixel values in each of the color channels. Publicly-known various methods can be applied as the generation method for the histograms, but the histogram generation module 104 generates the histograms as follows, for example. The generation method for the histogram in the red channel is exemplified. In this case, the numerical value $R_{xy}$ is indicated as the gradation value on 256 levels of from 0 to 255, and hence the histogram generation module 104 refers to the numerical value $R_{xy}$ in the red channel of each of the pixels of the color image 40 to count the frequency of each of the gradation values, to thereby generate the histogram in the red channel. The histogram generation module 104 refers to the numerical values $G_{xy}$ and $B_{xy}$ to count the frequencies of each of the gradation values, to thereby generate the histograms also in the green channel and the blue channel in the same way. A description is given of the case in which the histogram generation module 104 generates the histogram in each of the red channel, the green channel, and the blue channel, but the histogram generation module 104 may generate one histogram (so-called brightness histogram), which is a sum of those three color channels.

In this embodiment, a description is given of a case in which the histogram generation module 104 carries out histogram equalization processing in each of the regions in the image 40, and then generates the histograms. The histogram equalization processing is processing of converting respective pixel values so that a graph indicating a cumulative value of the frequency in the histogram becomes linear. Even when an uneven distribution exists in the gradation value, an even distribution in the gradation value can be achieved by applying the histogram equalization processing to the image. As the histogram equalization processing itself, publicly-known various types of processing can be applied. For example, the histogram generation module 104 acquires the frequency of each of the gradation values in the region in the image 40, to thereby identify the gradation value at which the frequency is equal to or more than a reference (for example, equal to or more than 1). The histogram generation module 104 substitutes the identified gradation value and the frequency thereof into a given mathematical expression, to thereby carry out the histogram equalization processing. This mathematical expression is defined so that a gradation value having a frequency equal to or more than the reference is distributed in the range of the gradation value (in this case, each numerical value is indicated in 8 bits, and the range is thus from 0 to 255). For example, when the numerical values $R_{xy}$ in a certain region are concentrated in a range of from 50 to 100, and frequencies of the other gradation values are zero, the numerical values $R_{xy}$ are converted so that the gradation values of from 50 to 100 are distributed in the range of from 0 to 255, which can be expressed in 8 bits.

Figure 4:
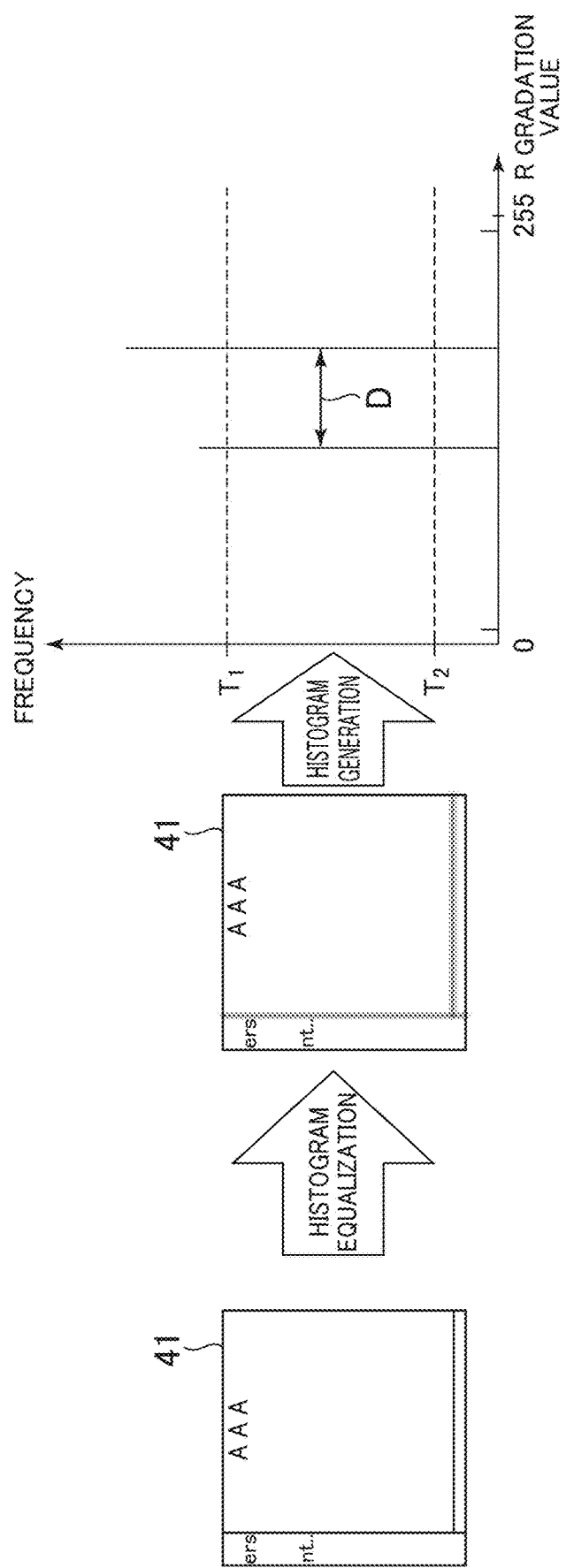
FIG. 4 is an explanatory diagram for illustrating processing of generating a histogram in a region.

FIG. 4 is an explanatory diagram for illustrating processing of generating a histogram in a region 41. As illustrated in FIG. 4, the region 41 is a region in which the number of colors and changes in colors are relatively small, and the numbers of pixels having the same colors are thus large. In other words, the region 41 is a region in which frequencies are concentrated in predetermined gradation values. Therefore, when the histogram generation module 104 carries out the histogram equalization processing in the region 41 to generate histograms, histograms each having a sparse color distribution are generated. The example of FIG. 4 is a case in which the histogram generation module 104 carries out the histogram equalization processing in the red channel in the region 41. For example, when the numerical values $R_{xy}$ of almost all of the pixels $P_{xy}$ in the region 41 are 100 and 140, the frequencies are concentrated in 100 and 140, and the frequencies at other gradation values are almost zero. Therefore, when the histogram generation module 104 carries out the histogram equalization processing in the region 41, a histogram having a sparse distribution is generated as illustrated in FIG. 4.

Figure 5:
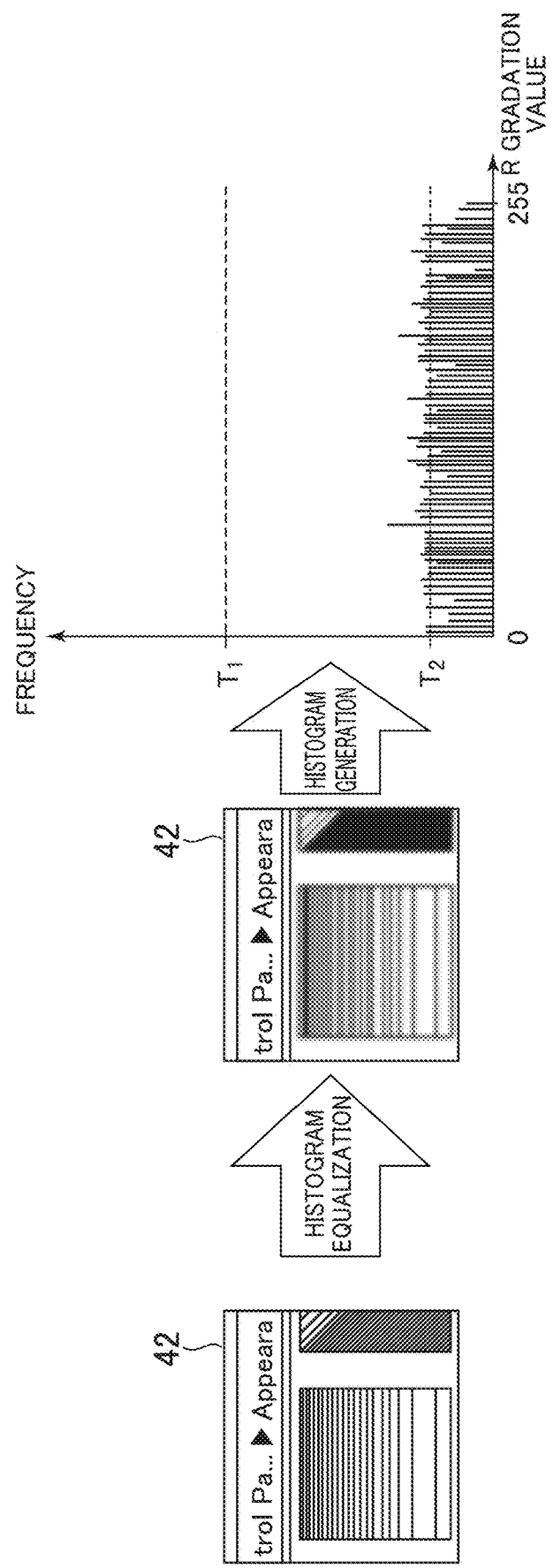
FIG. 5 is an explanatory diagram for illustrating the processing of generating a histogram in a region.

FIG. 5 is an explanatory diagram for illustrating processing of generating a histogram in a region 42. As illustrated in FIG. 4, the region 42 is a region in which the number of the colors and the change in colors are relatively large, and the numbers of pixels in the same colors are thus small. In other words, the region 42 is a region in which the frequencies are not concentrated in predetermined gradation values, but are evenly distributed to the respective gradation values. Therefore, when the histogram generation module 104 carries out the histogram equalization processing in the region 42 to generate histograms, histograms each having a sparse color distribution are not generated. The example of FIG. 5 is a case in which the histogram generation module 104 carries out the histogram equalization processing in the red channel in the region 42. For example, when the numerical values $R_{xy}$ of the respective pixels $P_{xy}$ are evenly distributed between 0 and 255 in the region 42, the frequencies at 0 to 255 are almost the same. Therefore, when the histogram generation module 104 carries out the histogram equalization processing in the region 42, the color distribution does not become sparse as illustrated in FIG. 5.

[2-6. Region Selection Module]

The region selection module 105 is implemented mainly by the controller 11. The region selection module 105 is configured to select a region 41 having a sparse color distribution in the histogram generated by the histogram generation module 104 from the image 40. In this embodiment, the histogram is generated in each of the color channels for a color image having the plurality of color channels, and hence the region selection module 105 selects the region 41 having a sparse color distribution in the histogram generated by the histogram generation module 104 in each of the color channels.

Being sparse in the color distribution means that a degree of sparseness (density) of gradation values at which a frequency equal to or more than a predetermined frequency appears is equal to more than a reference (equal to or more than a reference density). For example, it is determined whether or not the color distribution is sparse as follows.

For example, when the color distribution is sparse, the frequencies are concentrated in specific gradation values, and when the color distribution presents a gradation, the frequencies are distributed to the respective gradation values. Thus, when the number of gradation values each having a frequency equal to or more than a first threshold $T_1$ is equal to or more than a predetermined number, the region selection module 105 may determine that the color distribution is sparse. For example, when the predetermined number is set to two, the number of gradation values each having the frequency equal to or more than the threshold $T_1$ is two, which is equal to or more than the predetermined number, in the histogram in the region 41 illustrated in FIG. 3, and the region selection module 105 thus determines that the color distribution in the region 41 is sparse. Meanwhile, in the histogram in the region 42, the number of gradation values having the frequency equal to or more than the threshold $T_1$ is zero, which is less than the predetermined number, and the region selection module 105 thus determines that the color distribution in the region 42 is not sparse.

Moreover, for example, when the color distribution is sparse, the number of gradation values having a frequency of 0 is large, and when the color distribution presents a gradation, the gradation values having a frequency of 0 hardly exists. Therefore, conversely to the above description, the region selection module 105 may determine that the color distribution is sparse when the number of gradation values each having a frequency equal to or more than a second threshold $T_2$ ($T_2 \ll T_1$) is less than a predetermined number. For example, when the predetermined number is set to ten, the number of gradation values each having the frequency equal to or more than the threshold $T_2$ is two, which is less than the predetermined number, in the histogram in the region 41, and the region selection module 105 thus determines that the color distribution in the region 41 is sparse. Meanwhile, in the histogram in the region 42, the number of gradation values having the frequency equal to or more than the threshold $T_2$ is large, which is equal to or more than the predetermined number, and the region selection module 105 thus determines that the color distribution in the region 41 is not sparse.

Moreover, for example, when attention is focused not on the number of gradation values as described above, but on a distance between peaks, when the color distribution is sparse, the distances between the peaks are long, and when the color distribution presents a gradation, the distances between the peaks are short. Therefore, the region selection module 105 may determine that the color distribution is sparse when distances D between peaks (for example, a frequency equal to more than the threshold $T_2$ is considered as a peak) are equal to or longer than a predetermined distance (for example, five). In this case, the distance D is a value of a difference between a gradation value of a certain peak and a gradation value of a neighboring peak. For example, the predetermined distance may be determined based on the change amount of the numerical values $R_{xy}$, $G_{xy}$, and $B_{xy}$ by the image processing module 106 described later. This is because, when the numerical values $R_{xy}$, $G_{xy}$, and $B_{xy}$ are changed through the embedment of the watermarks to become the same as neighboring peaks, portions at which the watermarks are embedded may not be able to be identified, and the numerical values are thus prevented from being the same as the neighboring peaks. For example, the distance D is equal to or longer than the predetermined distance in the histogram of the region 41, and hence the region selection module 105 determines that the color distribution in the region 41 is sparse. Meanwhile, in the histogram in the region 42, each of the distances D between peaks is "1" or "2", which is less than the predetermined distance, and the region selection module 105 thus determines that the color distribution in the region 41 is not sparse.

In the manner described above, the region selection module 105 determines a region having a sparse color distribution from the image 40, and selects the region. For example, the region selection module 105 identifies a region having a sparse color distribution in the red channel, and selects the region as a region in which the watermarks are to be embedded in the red channel. Moreover, for example, the region selection module 105 identifies a region having a sparse color distribution in the green channel, and selects the region as a region in which the watermarks are to be embedded in the green channel. The region selection module 105 identifies a region having a sparse color distribution in the blue channel, and selects the region as a region in which the watermarks are to be embedded in the blue channel. The region having a sparse color distribution is a region without a gradation, and is a region having a large difference in color (difference in color between a certain pixel and pixels therearound). In other words, the region having a sparse color distribution is a region having a great degree of the change in color. Therefore, the region selection module 105 selects a region in which a difference in color is equal to or more than a reference.

[2-7. Image Processing Module]

The image processing module 106 is implemented mainly by the controller 11. The image processing module 106 is configured to embed watermarks in the region 41 selected by the region selection module 105. The image processing module 106 changes one or more of the numerical values $R_{xy}$, $G_{xy}$, and $B_{xy}$ contained in the pixel value, to thereby embed watermarks. In this embodiment, the region is selected in each of the color channels by the region selection module 105, and hence the image processing module 106 changes the numerical values in the color channel in the region selected in each of the color channels by the region selection module 105, to thereby embed a watermark in the region.

Figure 6:
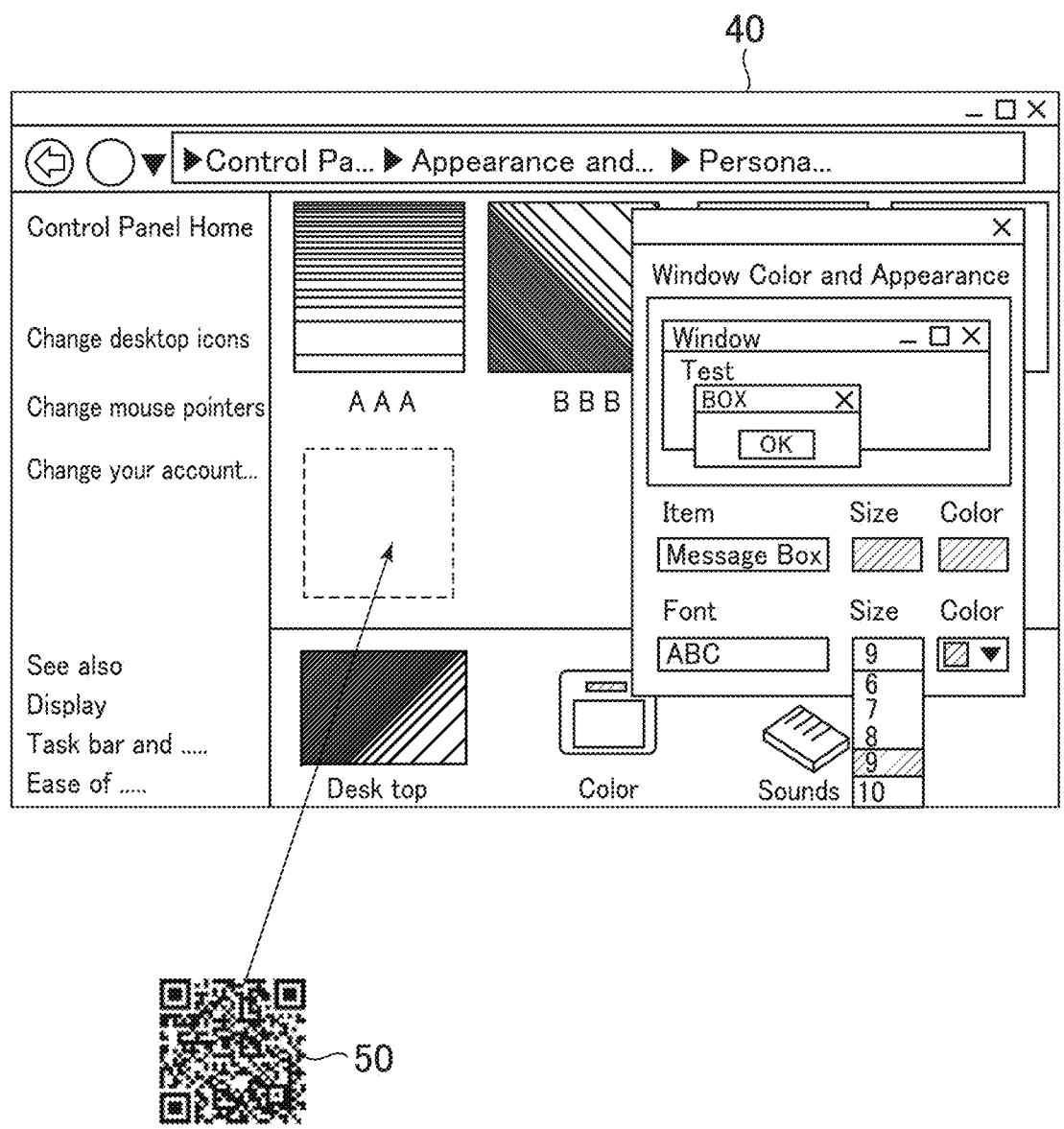
FIG. 6 is a diagram for illustrating how a watermark is embedded.

FIG. 6 is a diagram for illustrating how the watermark is embedded. In the following, a description is given of a case in which the region selection module 104 selects the region 41 in all of the color channels. In other words, a description is given of a case in which the image processing module 106 embeds the watermark 50 in the region 41 in all of the color channels.

As described above, in this embodiment, the watermark 50 is a 2D code. Each of cells of the 2D code takes any one of values of 0 and 1. For example, a cell corresponding to "0" does not have a color, and a cell corresponding to "1" has a color. Herein, not having a color means having the same color as a background color, and having a color means having a color different from the background color. In other words, a region corresponding to a cell of "0" of the watermark 50 to be embedded in the red channel does not have a color of red, and a region corresponding to a cell of "1" has the color of red. Similarly, a region corresponding to a cell of "0" of the watermark 50 to be embedded in the green channel and the blue channel does not have a color of green and a color of blue, respectively, and a region corresponding to a cell of "1" has the color of green and the color of blue, respectively. Therefore, in FIG. 4, the watermark 50 is illustrated in black, but the watermark 50 to be embedded in each of the color channels actually has the color of red, green, or blue. One cell of the 2D code of the watermark 50 may be constructed of one pixel or a plurality of pixels of the image. For example, when a watermark 50 large enough to withstand image compression is employed, one cell is only required to be constructed of a plurality of pixels.

For example, the image processing module 106 does not change the pixel value of the pixel corresponding to the cell of "0" of the watermark 50, and changes the pixel value of the pixel corresponding to the cell of "1" of the watermark 50. Specifically, the image processing module 106 does not change a pixel value ($R_{xy}$, $G_{xy}$, $B_{xy}$) of a pixel $P_{xy}$ corresponding to the cell of "0" of the watermark 50, and changes to ($R_{xy}+1$, $G_{xy}+1$, $B_{xy}+1$) the pixel value of a pixel $P_{xy}$ corresponding to the cell of "1" of the watermark 50. As described above, in this case, a description is given of the case in which the watermark is embedded in all of the color channels, and each of all of the numerical values $R_{xy}$, $G_{xy}$, and $B_{xy}$ thus increases by one. Thus, the pixel values of the region in which the watermark 50 is embedded only slightly change, and hence, as illustrated in FIG. 4, the watermark 50 is in a state in which the watermark 50 is less likely to be noticeable with the human eyes (invisible state).

A description has been given of the case in which the image processing module 106 increases the numerical values $R_{xy}$, $G_{xy}$, and $B_{xy}$ in the respective color channels by one, but the image processing module 106 may change the numerical values by two or more. When the changes in the numerical values $R_{xy}$, $G_{xy}$, and $B_{xy}$ are too large, the invisibility may not be maintained, and the change amounts may thus be less than a threshold (for example, four). Moreover, instead of increasing the numerical values, the image processing module 106 may decrease the numerical values $R_{xy}$, $G_{xy}$, and $B_{xy}$ in the respective color channels. In this case, the image processing module 106 may decrease the pixel value of the pixel corresponding to the cell of "0" of the watermark 50, and does not change the pixel value of the pixel corresponding to the cell of "1" of the watermark 50. Moreover, the change amount of the numerical values $R_{xy}$, $G_{xy}$, and $B_{xy}$ in the respective color channels may be a fixed value or a variable value.

Moreover, the number of watermarks 50 to be embedded in one region may not be one, but may be two or more. The number of the watermarks 50 to be embedded in one region may be the same for all of the pieces of image data stored in the image database, or may be different for each piece of the image data. Further, the number of the watermarks 50 may be a fixed value or a variable value. When the number of the watermarks 50 is a variable value, the number of the watermarks 50 may be determined under a certain condition such as the user or the image data, or may be randomly determined.

Moreover, in the above-mentioned example, a description is given of the case in which the color distributions are sparse in all of the three color channels in the region 41, but when the color distributions are sparse only in a part of the color channels, the image processing module 106 changes the numerical values only in the part of the color channels. For example, when the color distribution is sparse only in the red channel in the region 41, the image processing module 106 changes the numerical values $R_{xy}$ only in the red channel. Even when only a part of the color channels have sparse color distributions, the watermark may be embedded in all of the color channels. Further, even when all of the three color channels have sparse color distributions, the image processing module 106 is not always required to embed the watermarks in all of the color channels, and may embed the watermark in any one or two of the color channels. In this case, the color channel in which the watermark is to be embedded may be fixed, or may be variable under a given condition.

[2-6. Image Provision Module]

The image provision module 107 is implemented mainly by the controller 11. The image provision module 107 is configured to provide image data (namely, image data having changed pixel values) in which the watermarks are embedded by the image processing module 106 to the user from which the request is received by the request reception module 101. For example, the image provision module 107 may transmit the image data itself in which the watermarks are embedded to the user terminal, or without transmitting the image data itself, transmit only data (display data for a screen) for displaying the image in which the watermarks are embedded on the display 25 to the user terminal.

3. Processing to be Carried Out in Image Processing System

A description is now given of watermark embedment processing of embedding watermarks in an image and watermark detection processing of detecting watermarks embedded in an image as examples of processing to be carried out in the image processing system 1. The processing described below is an example of processing to be carried out by the functional blocks illustrated in FIG. 2.

Figure 7:
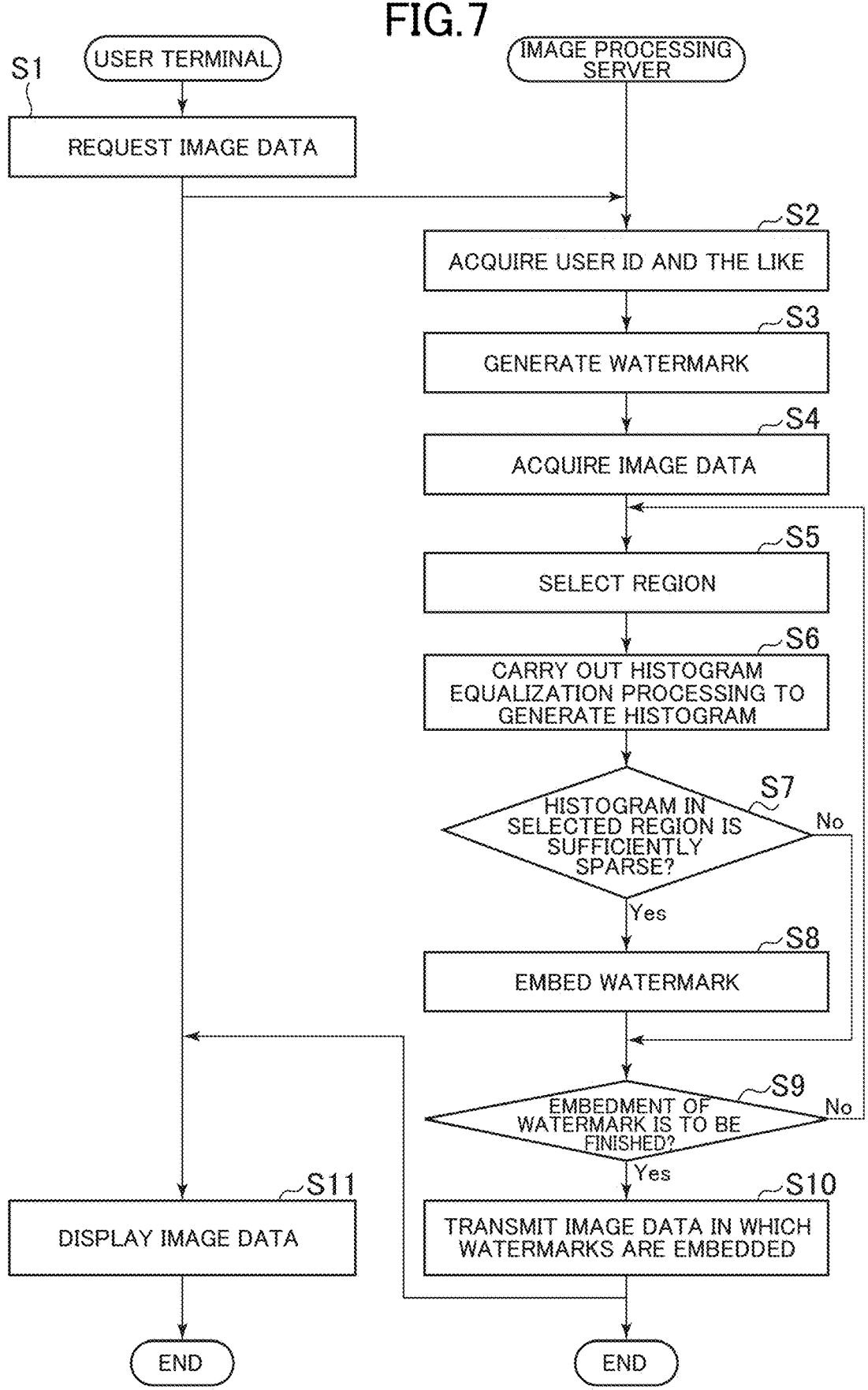
FIG. 7 is a flowchart for illustrating an example of watermark embedment processing.

FIG. 7 is a flowchart for illustrating an example of the watermark embedment processing. The processing illustrated in FIG. 7 is carried out by the controller 11 operating in accordance with the program stored in the storage 12, and the controller 21 operating in accordance with the program stored in the storage 22.

As illustrated in FIG. 7, first, when the user carries out a predetermined operation from the operation device 24 in the user terminal 20, the controller 21 requests image data from the image processing server 10 (Step S1). The request for the image data is only required to be carried out in a predetermined form, and contains, for example, information (file name, link information, and the like) for identifying the requested image data. When the request is transmitted from the user terminal 20 to the image processing server 10, it is assumed that a user ID and an IP address are transmitted, and the image processing server 10 can thus identify which user is making the access.

When the request for the image data is received in the image processing server 10, the controller 11 refers to the user database, and acquires information including the user ID of the user who has requested the image data (Step S2). In Step S2, the controller 11 acquires information to be embedded as the watermarks based on the request for the image data. This information may contain a time and date of the request for the image data by the user, and a time and date of provision of the image data to the user.

The controller 11 generates the watermarks based on the information acquired in Step S2 (Step S3). It is assumed that a program for generating the watermarks is stored in the storage 12. In this embodiment, the 2D code is used as the watermark, and a publicly-known 2D code builder may thus be used. In Step S3, the controller 11 inputs the information acquired in Step S2 into the 2D code builder, to thereby generate the watermarks.

The controller 11 refers to the image database, to thereby acquire the image data requested by the user (Step S4). The controller 11 selects a region in an image indicated by the image data (Step S5). In Step S5, the controller 11 selects a candidate of the region in which the watermark is to be embedded. For example, the controller 11 may sequentially select the region starting from a predetermined position in the image, or may use a random number to randomly select the region.

The controller 11 carries out the histogram equalization processing on the region selected in Step S5, to thereby generate histograms (Step S6). In Step S6, the controller 11 carries out the histogram equalization processing in each of the color channels, and thus generates three histograms in the red channel, the green channel, and the blue channel.

The controller 11 determines whether the color distribution in the region selected in Step S5 is sufficiently sparse based on the histograms generated in Step S6 (Step S7). In Step S7, the controller 11 uses the thresholds $T_1$ and $T_2$ to carry out the determination processing, or uses the distances D between the peaks to carry out the determination processing as described above. The determination in Step S7 is carried out in each of the color channels. When the color distribution is determined to be sparse in one or more color channels, in Step S7, it is determined that the color distribution is sufficiently sparse.

When the color distribution is determined to be sufficiently sparse (Y in Step S7), the controller 11 selects the region selected in Step S5 as a region in which the watermark is to be embedded, and embeds the watermark generated in Step S3 (Step S8). In Step S8, the controller 11 changes the numerical values in the color channels determined to be sparse out of the numerical values $R_{xy}$, $G_{xy}$, and $B_{xy}$ in the region in which the watermark is to be embedded, based on the method described with reference to FIG. 6.

The controller 11 determines whether or not to finish the embedment of the watermark (Step S9). The determination processing in Step S9 is only required to be carried out under a predetermined condition. For example, the condition may be a condition that a predetermined number of watermarks have been embedded, or a condition that a region to be selected no longer exists.

When the embedment is determined to be finished (Y in Step S9), the controller 11 transmits the image data in which the watermarks are embedded in Step S8 to the user terminal 20 (Step S10). When a region having a sparse color distribution is not found, the controller 11 may transmit the image data without the watermarks being embedded, or may embed the watermarks at positions that are defined in advance or randomly selected, and then transmit the image data. When the image data is received in the user terminal 20, the controller 21 displays the received image data on the display 25 (Step S11).

When the watermark embedment processing described above is carried out, the user is brought into a state in which the user can upload the received image data, a screen shot of the display 25, and the like to a computer on the network 2. The watermark detection processing described below is processing of detecting the watermarks embedded in the color image uploaded to the computer on the network 2 in the administrator terminal 30.

Figure 8:
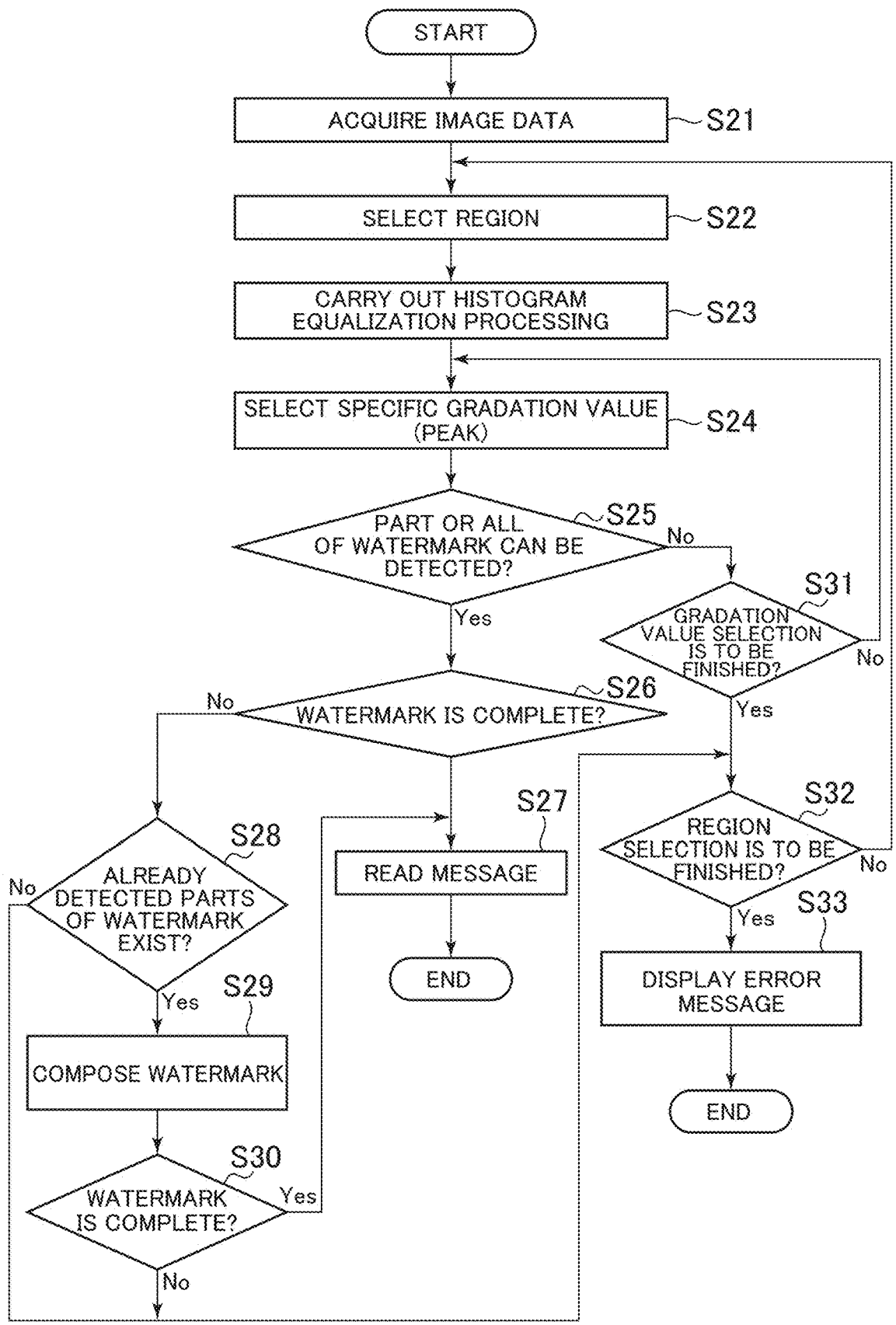
FIG. 8 is a flowchart for illustrating an example of watermark detection processing.

FIG. 8 is a flowchart for illustrating an example of the watermark detection processing. The processing illustrated in FIG. 8 is carried out by the controller 31 operating in accordance with a program stored in the storage 32. As illustrated in FIG. 8, first, the controller 31 acquires the image data disclosed on the computer on the network 2 (Step S21). In Step S21, the controller 31 may receive the image data from the computer on the network 2, or may read out the image data downloaded to the storage 32 in advance.

The controller 31 selects a region in the color image indicated by the image data acquired in Step S21 (Step S22). In Step S22, the controller 31 is only required to select the region in the color image based on a predetermined method, and may sequentially select a region having a predetermined size from a predetermined position in the image, or may randomly select a region. The processing starting from Step S22 is carried out in each of the color channels. In other words, the controller 31 carries out processing from Step S22 and subsequent steps in the red channel, carries out processing from Step S22 and subsequent steps in the green channel, and carries out processing from Step S22 and subsequent steps in the blue channel.

The controller 31 carries out, in each of the color channels, histogram equalization processing for the region selected in Step S22 (Step S23). In Step S23, the controller 31 carries out the histogram equalization processing in each of the color channels, and thus generates three histograms in the red channel, the green channel, and the blue channel. The histogram equalization processing may be applied to the entire image, but through application of the histogram equalization processing to a part of the regions, distances between peaks in each of the gradation values can be increased, and hence the watermarks tend to appear more remarkably. Consequently, the watermarks can be detected more easily.

The controller 31 refers to the histograms generated in Step S23, to thereby select a specific gradation value (or a peak) (Step S24). In Step S24, the controller 31 compares frequencies appearing in the histogram with a threshold, and selects a gradation value at which the frequency equal to or more than a reference appears. This threshold is assumed to be stored in the storage 32.

The controller 31 determines whether or not a part or all of the watermark can be detected at the gradation value selected in Step S24 in anyone of the color channels (Step S25). In Step S25, the controller 31 determines whether or not predetermined patterns contained in the watermark are detected. When the 2D code is used as the watermark as in this embodiment, the controller 31 searches for the three finder patterns arranged at corners of the 2D code. For example, when one or two finder patterns are detected, the controller 31 determines that a part of the watermark is detected, and when the three finder patterns are detected, the controller 31 determines that all of the watermark is detected.

When it is determined that a part or all of the watermark can be detected (Y in Step S25), the controller 31 determines whether or not the detected watermark is complete (Step S26). When the watermarks are detected in a plurality of color channels in Step S25, the processing in Step S26 is carried out in each of the plurality of color channels. Moreover, when the 2D code is used as the watermark as in this embodiment, in Step S26, the controller 31 is only required to determine whether or not the watermark can be read by a publicly-known 2D code reader. Moreover, for example, the controller 31 may determine whether or not predetermined patterns contained in the watermarks have been detected. The pattern may be the same as or different from the pattern used in the determination in Step S25. In Step S26, the controller 31 may determine whether or not the alignment pattern, the timing pattern, or format information has been detected through use of the pattern matching.

When it is determined that the watermark is complete (Y in Step S26), the controller 31 reads a message contained in the watermark, and displays the message on the display 35 (Step S27), and the processing is finished. In Step S27, the controller 31 displays on the display 35 the information contained in the watermark, for example, the user ID.

On the other hand, when it is determined that the watermark is not complete (N in Step S26), the controller 31 refers to the storage 32, and determines whether or not parts of the watermark that have already been detected exist (Step S28). It is assumed that parts of the watermark that were previously detected in Step S25 are stored in the storage 32.

When it is determined that parts of the watermark exist (Y in Step S28), the controller 31 composes the part of the watermark detected in Step S25 and the parts of the watermark that have already been detected (Step S29). In Step S29, the controller 31 arranges predetermined patterns contained in each of the parts of the watermarks at predetermined positions, to thereby compose the watermark. For example, when the 2D code is used as the watermark as in this embodiment, the finder patterns are arranged at the three corners, and the finder patterns contained in the respective parts of the watermark are thus arranged at the corners. In Step S29, the controller 31 may compose a part of the watermark detected in one color channel and a part of the watermark detected in another color channel.

The controller 31 determines whether or not the watermark composed in Step S29 is complete (Step S30). The processing in Step S30 is the same as that in Step S26. When the watermark is determined to be complete (Y in Step S30), in Step S27, the message is read out, and the processing is finished. On the other hand, when the watermark is determined not to be complete (N in Step S30), the processing proceeds to Step S32.

When it is determined in Step S25 that a part or all of the watermark cannot be detected (N in Step S25), the controller 31 determines whether or not the selection of the gradation value in Step S24 is to be finished (Step S31). In Step S31, the controller 31 determines whether or not a gradation value that has not been selected yet exists. When it is determined that the selection of the gradation value is not to be finished (N in Step S31), the controller 31 returns to the processing in Step S24, and the detection processing for the watermark is carried out for a next gradation value.

On the other hand, when it is determined that the selection of the gradation value is to be finished (Y in Step S31), the controller 31 determines whether or not all regions have been selected in Step S22 (Step S32). When it is determined that a region that has not been selected exists (N in Step S32), the controller 32 returns to the processing in Step S22, and the detection processing for the watermark is carried out for a next region.

On the other hand, when it is determined that the selection of the region is to be finished (Y in Step S32), the controller 31 displays on the display 35 an error message indicating that the watermark has failed to be detected (Step S33), and the processing is finished.

With the above-mentioned image processing system 1, the watermarks are embedded in regions in which color distributions are sparse, and the watermarks are thus easily detected, and hence the certainty of detecting watermarks can be increased. For example, as in the image 40 illustrated in FIG. 3, the certainty of the detection of the watermarks is increased by embedding the watermarks not in the region 42 presenting a gradation, but in the region 41 having a large difference in color.

Moreover, the image processing server 10 selects a region having a sparse color distribution in each of the color channels, to thereby embed the watermark. Thus, a larger number of watermarks can be embedded, and the invisibility of the watermarks can also be increased. For example, in a region in which the color distribution is sparse in the red channel while the color distribution is not sparse in the green channel or the blue channel, the color distribution may be considered not to be sparse as a whole, and the watermarks may thus be not to be embedded. However, such a region is selected as a region in which the watermark is to be embedded by selecting a region in each of the color channels, and a larger number of the watermarks can thus be embedded. Further, when the watermarks are embedded in all of the color channels, a total change amount of the pixel value increases. However, the total change amount of the pixel value can be suppressed by embedding the watermarks only in color channels each having a sparse color distribution, and the invisibility of the watermarks can thus be increased. For example, when the watermarks are embedded in all of the color channels in a region in which the color distribution is sparse in the red channel while the color distribution is not sparse in the green channel or the blue channel, the pixel value changes by a total of three. However, when the watermark is embedded only in the red channel, the pixel value changes only by one, and the invisibility can thus be increased.

Moreover, the determination of whether or not the color distribution is sparse can accurately be made by generating the histogram after the histogram equalization processing in each region. As a result, the watermark can be embedded in a region in which the watermark can more easily be detected, and the probability of detecting the watermark can thus be increased.

Moreover, the information for identifying the user who has requested the image data from the image processing server 10 is contained in the watermarks, and hence, for example, even when the user leaks an image that is confidential information on a company to the outside of the company, the user can be identified from the watermarks. As a result, the leakage of the image can be prevented beforehand.

4. Modification Examples

The present invention is not limited to the above-mentioned embodiment. The present invention may appropriately be modified without departing from the purport of the present invention.

Figure 9:
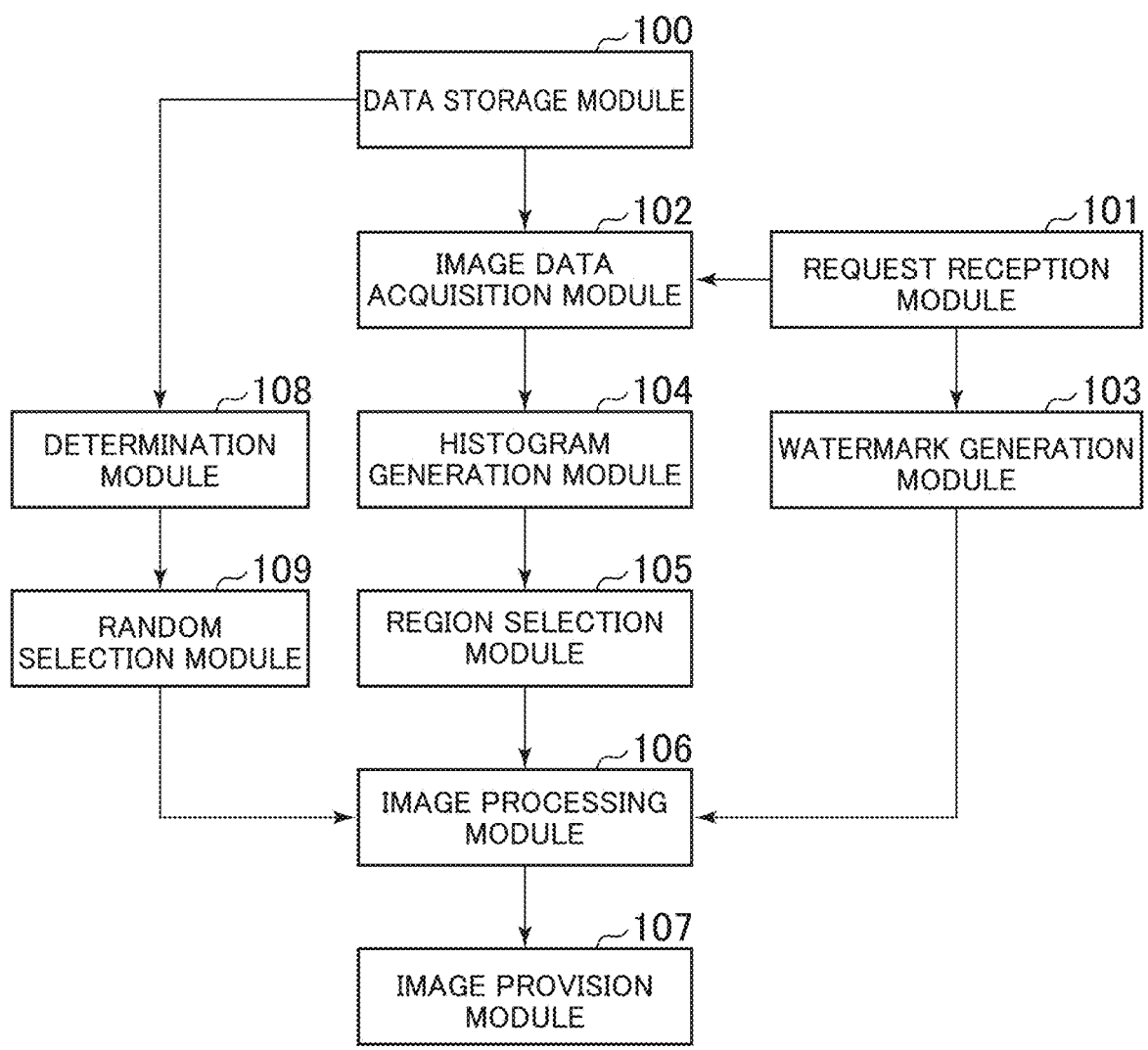
FIG. 9 is a functional block diagram for illustrating modification examples of the present invention.

FIG. 9 is a functional block diagram of modification examples of the present invention. As illustrated in FIG. 9, a determination module 108 and a random selection module 109 are implemented in addition to the functions of the embodiment in the modification examples described below.

(1) For example, the above-mentioned image data also includes moving image data. In the moving image, a plurality of still images are continuously reproduced. When the watermark embedment processing is carried out for each of the still images, the processing becomes complex. Therefore, when the user requests the moving image data, the watermarks may be embedded at randomly determined positions, and the watermark embedment processing described in the embodiment may be carried out only when the user requests the still image data.

In the image processing system 1 in Modification Example (1) of the present invention, the determination module 108 and the random selection module 109 are implemented. The determination module 108 is implemented mainly by the controller 11. The determination module 108 is configured to determine whether the image data acquired by the image data acquisition module 102 is still image data or moving image data. The determination module 108 refers to a data format of the image data, to thereby make the determination. For example, the determination module 108 may refer to an extension of the image data or a property of the image data. In this case, the data format is stored in the image database, and the determination module 108 thus refers to the image database, to thereby make the determination.

The random selection module 109 is implemented mainly by the controller 11. The random selection module 109 is configured to randomly select a region from the image 40. The size of the region may be fixed or may randomly be determined. For example, the random selection module 109 generates a random number based on a random number generation algorithm, and selects a region containing a position determined based on the random number. This position may be screen coordinates obtained by assigning the random number to a predetermined mathematical expression.

The image processing module 106 embeds the watermark in the region selected by the region selection module 105 when the determination module 108 determines that the image data is still image data. The image processing module 106 embeds the watermark in the region randomly selected by the random selection module 109 when the determination module 108 determines that the image data is moving image data. Processing itself of embedding the watermark is the same as the method described in the embodiment.

With Modification Example (1), because moving image data contains a large number of images and a possibility of detecting a watermark in any of the images is thus high, a processing load on the image processing server 10 can be decreased by embedding watermarks in a randomly selected region.

(2) Moreover, for example, when the region selection module 105 selects a plurality of regions, the image processing module 106 may embed the watermarks in all of the plurality of regions. In this case, the region selection module 105 may select regions until a selectable region no longer exists in the image, or may select regions until a predetermined number of regions have been selected. Processing itself of embedding the watermark in each of the regions is the same as the method described in the embodiment.

With Modification Example (2), a larger number of watermarks can be embedded in an image.

(3) Moreover, for example, in the embodiment, a description is given of the case in which, when a plurality of regions each having a sparse color distribution exist, the watermarks are embedded in all of the plurality of regions, but the watermarks may not be embedded in all of the plurality of regions, but may be embedded in an order starting from a region having the most sparse color distribution.

When a plurality of regions are selected by the region selection module 105, the image processing module 106 selects a predetermined number of regions in an order starting from a region having the most sparse color distribution in the histogram generated by the histogram generation module 104 out of the plurality of regions, and embeds the watermarks in the predetermined number of regions. The image processing module 106 determines a degree of sparseness of the color distribution based on the histogram. For example, the image processing module 106 selects a predetermined number of regions in an order starting from a region having the largest number of gradation values equal to or more than the threshold $T_1$. Moreover, for example, the image processing module 106 may select a predetermined number of regions in an order starting from a region having the smallest number of gradation values equal to or more than the threshold $T_2$. Moreover, for example, the image processing module 106 may select a predetermined number of regions in an order starting from a region having the longest distance D.

With Modification Example (3), the watermark is embedded in a region having a more sparse color distribution with higher priority, and the probability of detecting the watermark can thus be increased.

(4) Moreover, Modification Examples (1) and (2) or Modification Examples (1) and (3) may be combined with each other.

Moreover, for example, in the embodiment, a description has been given of the case in which the watermark detection processing is carried out in the respective color channels, but, for example, when only a part of the watermarks has successfully been detected in the respective color channels, the watermarks detected in the respective color channels may be composed. For example, detection of one watermark may be tried by composing a part of the watermark detected in the red channel, a part of the watermark detected in the green channel, and a part of the watermark detected in the blue channel. Moreover, for example, when the watermarks are detected in a plurality of color channels, priorities may be assigned to the respective color channels, and the watermark in a color channel having a higher priority may be trusted. For example, when priority higher than that assigned to the watermark in the green channel is assigned to the watermark in the red channel, and the watermarks are detected both in the red channel and the green channel, the message may be output based on the watermark in the red channel.

Moreover, for example, the image processing module 106 may embed watermarks having directions different from one another in an image. Moreover, for example, the image processing module 106 may embed watermarks having sizes different from one another in an image. Moreover, for example, a watermark to be embedded in one color channel and a watermark to be embedded in another color channel may overlap each other. Moreover, a description has been given of the case in which a region selected in one color channel by the region selection module 105 and a region selected in another color channel by the region selection module 105 are the same, but the regions may overlap each other partially or may not overlap each other at all. In other words, the region selection module 105 may select regions so that a region in one color channel and a region in another color channel are different from each other.

Moreover, for example, a description has been given of the case in which the watermarks are embedded in still image data, but watermarks may be embedded in moving image data. Moreover, for example, the watermarks may be embedded not in a color image but in a grayscale image. Further, a code other than the 2D code may be used as the watermark, and an image and a text other than the code may be used as the watermark. Moreover, for example, any information may be contained in the watermark, and information other than the information on the user who has requested the image data may be contained.

Moreover, for example, the functions described as being implemented in the image processing server 10 may be implemented in another computer (for example, the user terminal 20 or the administrator terminal 30). In this case, the computer in which the functions described above are implemented corresponds to the image processing device of the present invention. Moreover, out of the above-mentioned functions, functions other than the image data acquisition module 102, the histogram generation module 104, the region selection module 105, and the image processing module 106 may be omitted.

The invention claimed is:

1. An image processing device, comprising at least one processor configured to:
   acquire image data;
   generate, based on pixel values of an image indicated by the image data, a histogram for each region in the image;
   select from the image a region having a sparse color distribution in the histogram; and
   select, when a plurality of regions are selected, a predetermined number of regions in an order starting from a region having the most sparse color distribution in the histogram out of the plurality of regions, and embed the watermarks in the predetermined number of regions.

2. The image processing device according to claim 1,
   wherein the image is a color image having a plurality of color channels,
   wherein the at least one processor is configured to:
      generate the histogram in each of the plurality of color channels based on the pixel values,
      select, in each of the plurality of color channels, a region that does not presents the gradation, and change a numerical value in each of the plurality of the color channels in the region that does not present the gradation in the each of the plurality of the color channels, to thereby embed the watermark in the region.

3. The image processing device according to claim 1, wherein the at least one processor is configured to carry out histogram equalization processing in each region in the image, and then generate the histogram.

4. The image processing device according to claim 1,
wherein the at least one processor is configured to receive a request for the image data by a user,
wherein the watermark contains information for identifying the user requesting the image data, and
wherein the at least one processor is configured to provide the image data in which the watermark is embedded to the user who has made the request.

5. The image processing device according to claim 1, wherein the at least one processor is configured to embed, when a plurality of regions are selected, the watermarks in all of the plurality of regions.

6. An image processing method, comprising:
acquiring image data;
generating, based on pixel values of an image indicated by the image data, a histogram for each region in the image;
selecting from the image a region having a sparse color distribution in the histogram;
selecting, when a plurality of regions are selected, a predetermined number of regions in an order starting from a region having the most sparse color distribution in the histogram out of the plurality of regions; and
embedding the watermarks in the predetermined number of regions.

* * * * *